(12) United States Patent
Mehrl et al.

(10) Patent No.: US 6,831,750 B2
(45) Date of Patent: Dec. 14, 2004

(54) METHOD AND APPARATUS FOR USING SPATIAL PATTERNS FOR MEASURING MIRROR TILT ANGLES IN DIGITAL MIRROR DEVICES

(75) Inventors: David J. Mehrl, Plano, TX (US); Kun Pan, Allen, TX (US); Benjamin L. Lee, Duncanville, TX (US)

(73) Assignee: Texas Instruments Incorporated, Dallas, TX (US)

( * ) Notice: Subject to any disclaimer, the term of this patent is extended or adjusted under 35 U.S.C. 154(b) by 172 days.

(21) Appl. No.: 10/160,377

(22) Filed: May 31, 2002

(65) Prior Publication Data

US 2003/0223084 A1 Dec. 4, 2003

(51) Int. Cl.$^7$ .......................... G01B 11/14; G01B 11/26
(52) U.S. Cl. ...................... 356/614; 356/138
(58) Field of Search .......................... 356/310, 138, 356/139.02, 139.1, 140, 154, 614, 615, 620, 129.1; 385/18, 52; 359/846, 848, 267, 318, 290–292, 302, 315, 850, 851, 298, 855, 197–199; 398/129, 131, 156

(56) References Cited

U.S. PATENT DOCUMENTS

| | | | | |
|---|---|---|---|---|
| 3,269,254 A | * | 8/1966 | Kern et al. | 356/150 |
| 4,330,212 A | * | 5/1982 | Miller | 356/508 |
| 5,929,980 A | * | 7/1999 | Yamaguchi et al. | 356/4.03 |
| 6,323,982 B1 | | 11/2001 | Hornbeck | |
| 2002/0079432 A1 | | 6/2002 | Lee et al. | |

OTHER PUBLICATIONS

Chu et al., DMD™ superstructure characterizations, DLP—DMD Manufacturing and Design Challenges, TI Technical Journal, Jul.–Sep. 1998, pp. 75–86.

* cited by examiner

Primary Examiner—Zandra V. Smith
Assistant Examiner—Gordon J. Stock, Jr.
(74) Attorney, Agent, or Firm—Charles A. Brill; Wade James Brady, III; Frederick J. Telecky, Jr.

(57) ABSTRACT

A method and system for indirectly measuring the tilt angle of micromirrors in a micromirror array. The method and system aims a coherent light beam through an aperture in a screen so that it reflects off of the surface of the micromirror array and creates a pattern of reflected light on the screen. The micromirror array is loaded with a pattern that has a uniform power spectral density (such as a random, aperiodic pattern or a frequency chirped sinusoidal spatial pattern) whereby certain micromirrors will be placed in the "on" position and the other micromirrors will be placed in the "off" position. By loading the micromirror array with a pattern having a uniform power spectral density distribution, the discrete nature of the resulting diffraction pattern is reduced and a pair of $[\sin(x)/x]^2$ patterns will be generated on the screen. These $[\sin(x)/x]^2$ patterns can be used to measure a variety of characteristics of the micromirrors, such as tilt angle, "roll", and deformation of the mirrors as they are tilted.

14 Claims, 5 Drawing Sheets

METHOD AND APPARATUS FOR USING SPATIAL PATTERNS FOR MEASURING MIRROR TILT ANGLES IN DIGITAL MIRROR DEVICES

BACKGROUND

Micromechanical devices are small structures typically fabricated on a semiconductor wafer using techniques such as optical lithography, metal sputtering, plasma oxide deposition, and plasma etching that have been developed for the fabrication of integrated circuits. Digital micromirror devices (DMDs), sometimes referred to as deformable mirror devices, are a type of micromechanical device. Other types of micromechanical devices include accelerometers, pressure and flow sensors, gears and motors. Digital micromirror devices are primarily used in optical display systems. In display systems, the DMD is a light modulator which uses digital image data to modulate a beam of light by selectively reflecting portions of the beam of light to a display screen. While analog modes of operation are possible, DMDs are typically operated in a digital bistable mode of operation and as such are the core of true digital full-color image projection systems.

Many different kinds of micromirror devices exist, including torsion beam devices, and hidden-hinge devices. All micromirror devices, however, are usually operated in one of two modes of operation. The first mode of operation is an analog mode, sometimes called beam steering, wherein the address electrode is charged to a voltage corresponding to the desired deflection of the mirror. Light striking the micromirror device is reflected by the mirror at an angle determined by the deflection of the mirror. Depending on the voltage applied to the address electrode, the cone of light reflected by an individual mirror is directed to fall outside the aperture of a projection lens, partially within the aperture, or completely within the aperture of the lens. The reflected light is focused by the lens onto an image plane, with each individual mirror corresponding to a pixel on the image plane. As the cone of reflected light is moved from completely within the aperture to completely outside the aperture, the image location corresponding to the mirror dims, creating continuous brightness levels.

The second mode of operation is a digital mode. When operated digitally, each micromirror is fully deflected in either of the two directions about the torsion hinge axis. Digital operation uses a relatively large address voltage to ensure the mirror is fully deflected. The address electrodes are driven using standard logic voltage levels and a bias voltage, typically a positive voltage, is applied to the mirror metal layer to control the voltage difference between the address electrodes and the mirrors. Use of a sufficiently large mirror bias voltage, a voltage above what is termed the threshold voltage of the device, ensures the mirror will fully deflect toward the address electrode—even in the absence of an address voltage. The use of a large mirror bias voltage enables the use of low address voltages since the address voltages need only slightly deflect the mirror prior to the application of the large mirror bias voltage.

To create an image using the micromirror device, the light source is positioned at an angle relative to the device normal that is twice the angle of rotation so that mirrors rotated toward the light source reflect light in a direction normal to the surface of the micromirror device and into the aperture of a projection lens—creating a bright pixel on the image plane. Mirrors rotated away from the light source reflect light away from the projection lens—leaving the corresponding pixel dark. Intermediate brightness levels are created by pulse width modulation techniques in which the mirror rapidly is rotated on and off to vary the quantity of light reaching the image plane. The human eye integrates the light pulses and the brain perceives a flicker-free intermediate brightness level.

As can be appreciated, the angle at which a micromirror tilts in response to an applied voltage is an important characteristic of a micromirror. Indeed, the tilt angle of a micromirror must be uniform over the entire surface of a micromirror array in order for the array to effectively project images on a display screen. Thus, to properly characterize a micromirror array device, a tilt angle should be measured for the device based upon a given applied voltage.

Because the individual mirrors on a micromirror array are too small for mirror tilt angle to be directly measured in an efficient manner, the tilt angle is measured indirectly. Typically, this involves bouncing a light beam off of the micromirror array and measuring the angle at which the light beam is reflected. This process can become complicated due to the interference and distortion effects created by the wave nature of light. In an attempt to overcome these problems, two methods for measuring tilt angle have been developed: a coherent light measurement system; and a non-coherent light measurement system. Both of these methods, however, have certain limitations and drawbacks.

A coherent light measurement system 100 is depicted in FIG. 1. In FIG. 1, a coherent light source, such as laser 105, generates a coherent light beam 110 that is passed through an aperture 115 in a screen 120. The light beam 110 is then reflected off the surface of a micromirror array 125 into reflected beams 130 that are directed onto a screen 120. Because the micromirror array is a periodic reflecting structure, a diffraction pattern will be generated by the surface of the micromirror array. An example of such a diffraction pattern is illustrated in FIG. 2. In FIG. 2, a series of spots 200 are depicted in a pattern corresponding to the diffraction pattern generated by the micromirror array 125. The pattern includes a first spot 205 corresponding to a beam of light that was reflected from the surface of the micromirror array 125 at an angle equal to the angle of incidence of the incoming light beam 110. Accordingly, the first spot 205 corresponds to a "zeroth order" diffraction point. Also depicted in FIG. 2 are a series of spots, 210, 215, 220, 230 and 235, that are arranged on a line that passes through the first spot 205. Each of the spots 210–235 corresponds to increasing diffraction orders, respectively. For example, spot 210 corresponds to a first diffraction order, spot 215 corresponds to a second diffraction order, etc. Furthermore, each of these spots 210–235 are angularly separated by intervals of approximately $\lambda/T$, where $\lambda$ is the wavelength of the light beam 110 and T is the mirror pitch/spacing. A plurality of other spots 260 corresponding to the diffraction pattern are also depicted in FIG. 2. It should also be noted that the diffraction pattern 200 is symmetrical about the first spot 205, thereby creating a set of spots on the right-hand side of the pattern that correspond to each of the previously described spots 210–260.

As the mirrors of the micromirror array 125 of FIG. 1 are tilted to different angles, the relative intensity (but not the position) of these spots change. Indeed, in FIG. 2, spot 235 is depicted as having a greater intensity than the other spots. Similarly, spots 240–255 are depicted as having greater intensity than most of the other spots. Thus, to measure the mirror tilt angle, a location along the line of spots 210–235 must be identified that corresponds to the position of greatest intensity of the spots. This measurement process is problematic because it represents only an approximation of the location of greatest intensity, rather than a direct measurement. Furthermore, the use of interpolation (by examining the relative intensity of several adjacent orders and fitting to a theoretical distribution) is complicated by the fact that the interpolation is non-linear. These limitations prevent the coherent light measurement system 100 from obtaining measurements of tilt angle with a high level of accuracy.

BRIEF SUMMARY

The invention relates to an improved method and apparatus for measuring the tilt angle of micromirrors arranged in an array. The method and system directs a beam of coherent light through an aperture and onto a micromirror array so that it can be reflected by the array onto a screen. The individual mirrors in the micromirror array are activated and deactivated in a spatial pattern that has a flat power spectrum density distribution, such as a random, aperiodic pattern. Other patterns are suitable for use with this invention, however. The use of a pattern having a uniform power spectrum density reduces the discrete nature of the diffraction pattern that is generated by the micromirror array and thereby generates a pair of spatially distributed (i.e. nondiscrete) intensity patterns on the reflection screen. In an embodiment in which rectangular mirror are used to form the DMD array, the spatially distributed intensity patterns take the general form of a $[\sin(x)/x]^2[\sin(y)/y]^2$ distribution. For the sake of brevity, however, these patterns will be referred to henceforth as a $[\sin(x)/x]^2$ distribution. It should be noted that the general method disclosed in this application is valid for measuring mirror tilt angle even if the aperture transform is not a $[\sin(x)/x]^2$ function, so long as a spatial pattern is made to appear.

These $[\sin(x)/x]^2$ patterns are useful for accurately measuring many characteristics of the micromirror array, such as the tilt angle of the mirror. Although the periodic nature of the micromirror array is greatly reduced through the use of array patterns having uniform power spectral density, some residual periodicity of the array remains. This results in a residual diffraction pattern that can still be seen along with the $[\sin(x)/x]^2$ patterns on the reflection screen. By measuring the location of the $[\sin(x)/x]^2$ patterns with respect to the residual diffraction pattern, the tilt angle of the micromirror array can be measured with a high level of accuracy. Other characteristics of the micromirror array can also be measured by utilizing this system, such as the "roll" of the mirrors as they are tilted as well as the tilt angle for "on" mirrors and "off" mirrors separately.

DETAILED DESCRIPTION

Figure 3:
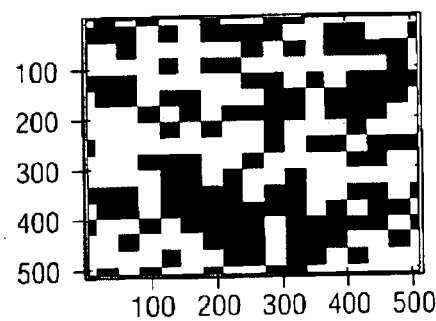
FIG. 3 is a random, aperiodic pattern that may be loaded into the micromirror array consistent with one aspect of the disclosed invention.
Figure 4:
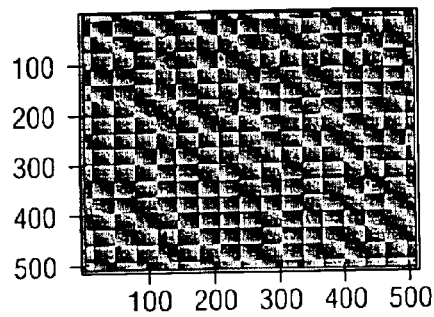
FIG. 4 is a plot of the depths of the individual micromirrors in a micromirror array after the array has been loaded with the pattern depicted in FIG. 4.

An improved method and system for measuring the tilt angle of mirrors in a micromirror array with a coherent light source is described herein. Mathematical analysis shows that the discrete nature of a diffraction pattern generated by a micromirror array 125 arises from the regular periodicity of the array. Thus, when an entire micromirror array is written to the "on" or "off" state, then a discrete diffraction pattern will inevitably be produced, thus presenting the problems of the coherent light measurement system that are described above. To address these problems, the micromirror array is activated with an aperiodic pattern of "on" and "off" states, thus eliminating much of the discrete nature of the micromirror array. An example of a random aperiodic pattern suitable for use with the invention is depicted in FIG. 3. A plot of the depth of each of the individual mirrors in the micromirror array that has been loaded with such a pattern is depicted in FIG. 4.

Figure 5:
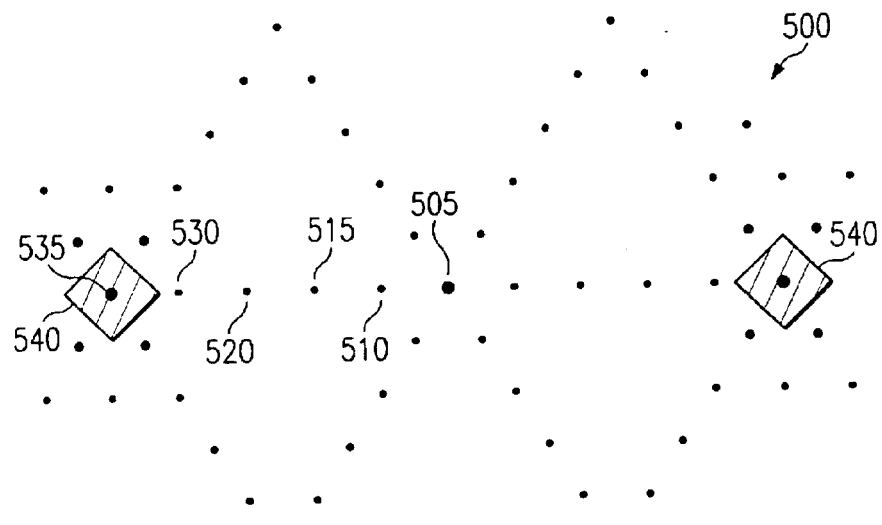
FIG. 5 is a diffraction pattern that is created by a micromirror array that has been loaded with a uniform power spectral density pattern and which has been illuminated with a coherent light source.

By loading a micromirror array 125 with random, non-peridic states (i.e. randomly assigning each micromirror a state of "on" or "off") and illuminating the micromirror array with a laser, the diffraction pattern generated by the reflected light beams is no longer discrete, and two $[\sin(x)/x]^2$ patterns prominently appear. A representative diffraction pattern generated by a micromirror loaded with a pattern in accordance to the invention is depicted in FIG. 5. In FIG. 5, a series of spots 500 are depicted in a pattern corresponding to the diffraction pattern of the micromirror array 125. The pattern includes a first spot 505 corresponding to a beam of light that was reflected from the surface of the micromirror array 125 at an angle equal to the angle of incidence of the incoming light beam 110. Accordingly, the first spot 505 corresponds to a "zeroth order" diffraction point. Also depicted in FIG. 5 are a series of spots, 510, 515, 520, 530 and 535, arranged on a line that passes through the first spot 505. Each of the spots 510–535 corresponds to increasing diffraction orders, respectively. For example, spot 510 corresponds to a first diffraction order, spot 515 corresponds to a second diffraction order, etc. Each of the spots 510, 515, 520, 530 and 535 lie on a 2-D rectalinear grid, with minimum spacing between adjacent spots being approximately $\lambda/T$, where $\lambda$ is the wavelength of the light beam 110 and T is the mirror pitch/spacing. Because the tilt axis of the mirrors is at 45° (due to the placement of the mirror hinge along a diagonal axis of the mirrors), the spots 510–535 lie along a line that corresponds to a diagonal of the mirror. Accordingly, spots that lie along this axis on the reflection screen are separated by intervals of approximately $\sqrt{2}\,\lambda/T$, rather than $\lambda/T$. Much like FIG. 2, the diffraction pattern 500 is symmetrical about the first spot 505, thereby creating a set of spots on the right hand side of the pattern that correspond to each of the previously described spots 510–535. Also depicted in FIG. 5 are a pair of $[\sin(x)/x]^2$ patterns 540 that are rotated by 45°. Each of these patterns 540 are displaced along the line of spots 510–535 at angles equal to twice the mirror tilt angle. Accordingly, by measuring the diffraction angle at which the centroids of the patterns 505 lie, the tilt angle of the micromirrors can be determined with a high level of accuracy.

Figure 2:
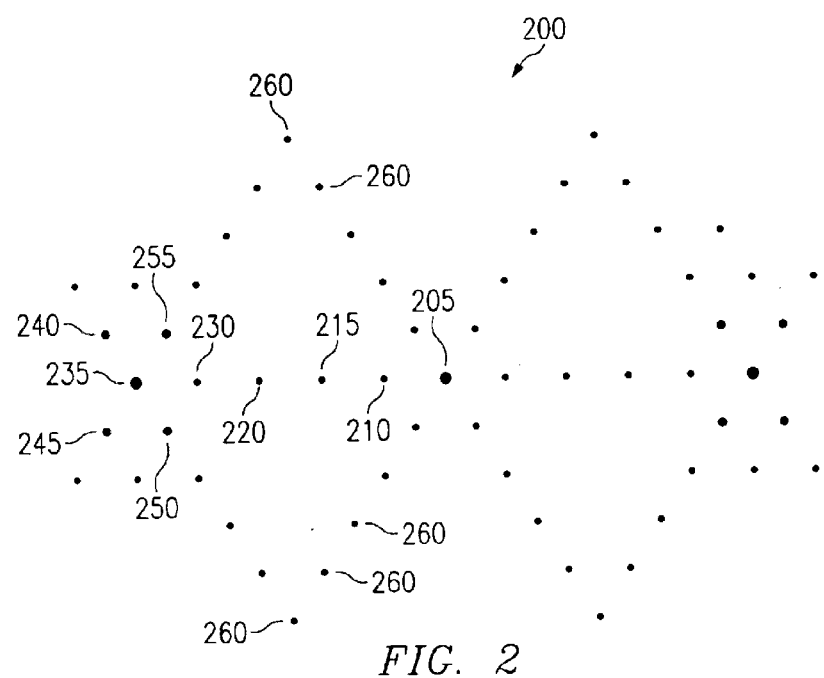
FIG. 2 is a diffraction pattern that is created by a micromirror array in which all of the mirrors have been placed in the same position ("on" or "off") and which has been illuminated with a coherent light source.

A residual discrete pattern, similar to the pattern depicted in FIG. 2, appears in the diffraction pattern 500 along with the $[\sin(x)/x]^2$ patterns 540. This residual discrete pattern arises as a result of the gaps that remain between the micromirrors regardless of whether the mirrors are tilted or not. This periodic pattern may serve as a built-in reference for ascertaining the angular position of the centroids of the patterns 540, since the angular location of these periodic diffraction orders may be derived using diffraction grating theory.

According to one embodiment, following equation can be used to determine the tilt angle α of the micromirror array:

$$\alpha = \tfrac{1}{2} \mathrm{ARCSIN}\,[(N\sqrt{2}\,\lambda)/T]$$

wherein N is the differential order number, λ is the wavelength of the laser beam, and T is the pitch of the micromirror. Other suitable methods, such as direct measurement of the displacement X, and distance Z, so that $\alpha = \tfrac{1}{2}\tan^{-1}(X/Z)$, may be utilized to calculate the tilt angle for the micromirror array 125. The differential order number N can be measured by calculating where the center of the $[\sin(x)/x]^2$ pattern 540 lies with respect to the line of spots (505–535).

Other useful measurements can be discerned by examining the location of the $[\sin(x)/x]^2$ patterns 540 on the diffraction pattern. Specifically, if the centers of the $[\sin(x)/x]^2$ patterns 540 are not aligned with the line of spots 510–535, but are instead centered away from the line, this can indicate that the mirrors in the micromirror array 125 are deformed in their landing position. This deformation can arise from a variety of problems, including, for example, distorted hinges or asymmetric spring tips. This deformation will result in a small component of tilt (i.e. "roll") that is in a direction orthogonal to the normal tilt direction. By measuring the degree to which the $[\sin(x)/x]^2$ patterns 540 are shifted away from the line of spots 510–535, the degree of distortion can be measured. In one application, the location of the $[\sin(x)/x]^2$ patterns 540 are monitored as the voltage applied to the landing electrode is ramped up to a peak value. In this manner the deformation of the mirrors as a function of applied landing electrode voltage can be measured.

Figure 7:
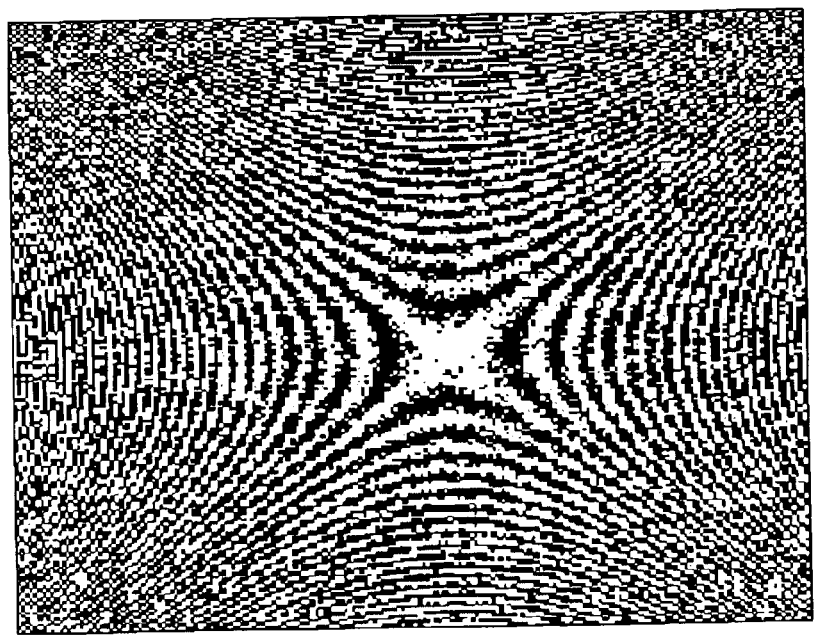
FIG. 7 is a representative example of a frequency chirped sinusoidal spatial pattern that may be loaded into the micromirror array consistent with one aspect of the disclosed invention.

A variety of aperiodic patterns are suitable for use with the method and system described herein. In general, all of these patterns will have the common characteristic of a relatively flat power spectral density distribution. Two patterns that have proven effective for use with the invention are: i) a frequency-chirped sinusoidal spatial pattern; and ii) a white noise (random) pattern. The white noise pattern has an additional advantage for measuring mirror tilt angle because it is homogeneous. This means that the illuminating laser spot does not require any special alignment with respect to the micromirror array 125. On the other hand, the frequency chirped sinusoidal spatial patterns have a spatial center that requires an illuminating laser spot to be aligned with this center location. A representative example of a frequency chirped sinusoidal spatial pattern suitable for use with the invention is depicted in FIG. 7.

Figure 1:
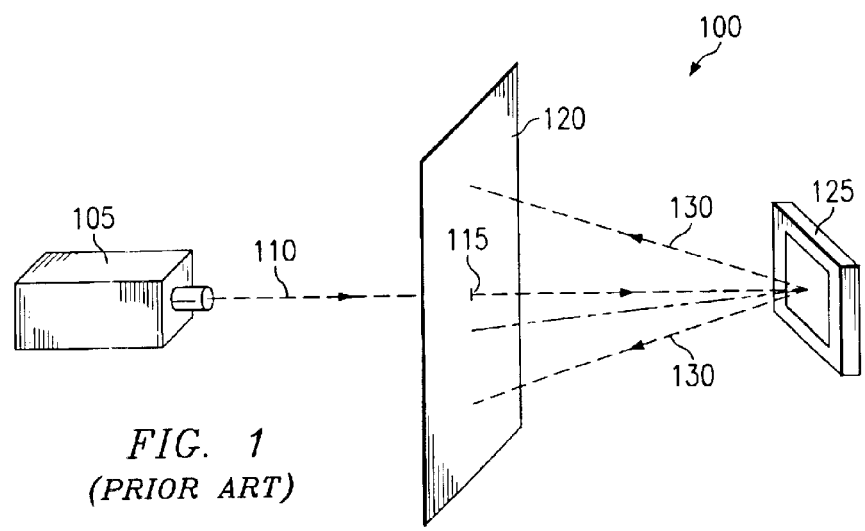
FIG. 1 is block diagram of a coherent light measurement system associated with the prior art.
Figure 6:
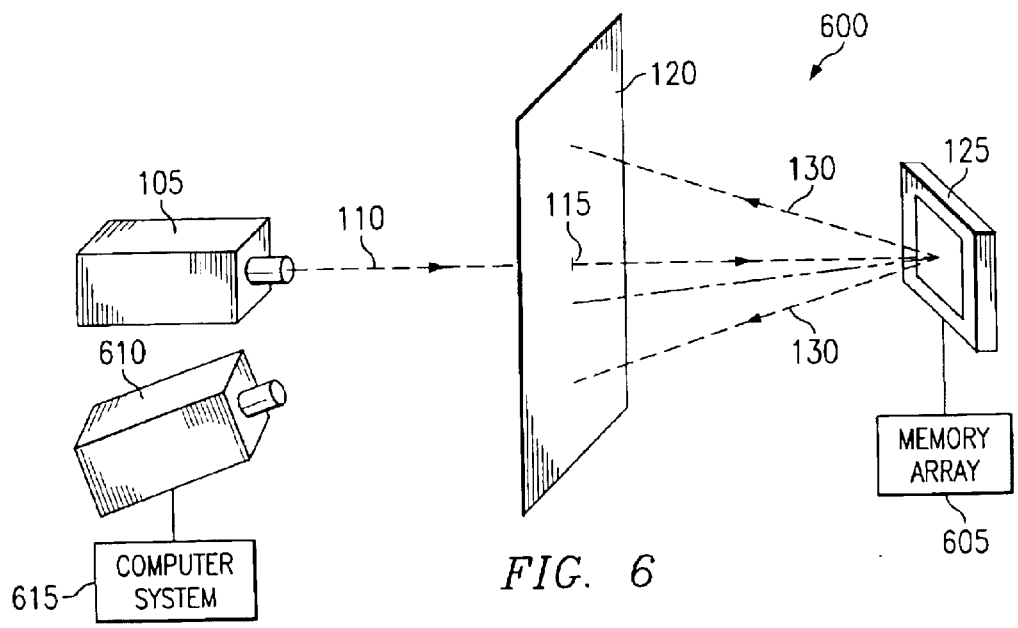
FIG. 6 is block diagram of a coherent light measurement system suitable for use with one aspect of the disclosed invention.

A coherent light measurement system 600 suitable for use with the invention is depicted in FIG. 6. In FIG. 6, a coherent light source, such as laser 105, generates a coherent light beam 110 that is passed through a hole 115 in a plate of ground glass 120. Unlike FIG. 1, however, the micromirror array is loaded with an aperiodic pattern, such as the one depicted FIG. 3. The aperiodic pattern may be provided to the micromirror array 125 by an electronic memory array 605, or other suitable means. The light beam 110 is reflected off the surface of a micromirror array 125 and the reflected light beams 130 are directed onto the ground glass 120. The diffraction pattern 500 and the $[\sin(x)/x]^2$ patterns 540 that are generated by the reflected light may be recorded by a camera 610 so that the diffraction pattern 500 may be electronically processed to more accurately calculate the tilt angle of the mirrors of the micromirror array 125. In accordance with this aspect of the invention, a computer system 615 may be connected to the camera 610. The computer system 615 may be adapted to perform a variety of functions on the data that is received from the camera. In particular, the computer system 615 may employ a variety of digital image processing techniques, such as threshold/clipping, compression, logarithmic conversion, center of mass, or other techniques for isolating the $[\sin(x)/x]^2$ patterns. Thus, the computer system 615 is well suited to analyze the diffraction patterns and determine the precise location/centroid of the $[\sin(x)/x]^2$ patterns with respect to the residual diffraction patterns. The computer system 615 may also be adapted to incorporate appropriate trigonometric formulas for calculating the tilt angle of the micromirrors in the micromirror array. The computer system 615 may also be adapted to determine the precise location of each of the $[\sin(x)/x]^2$ patterns so that the tilt angle of the "on" and "off" (i.e. activated and unactivated) mirrors, respectively, can be calculated.

Figure 9A:
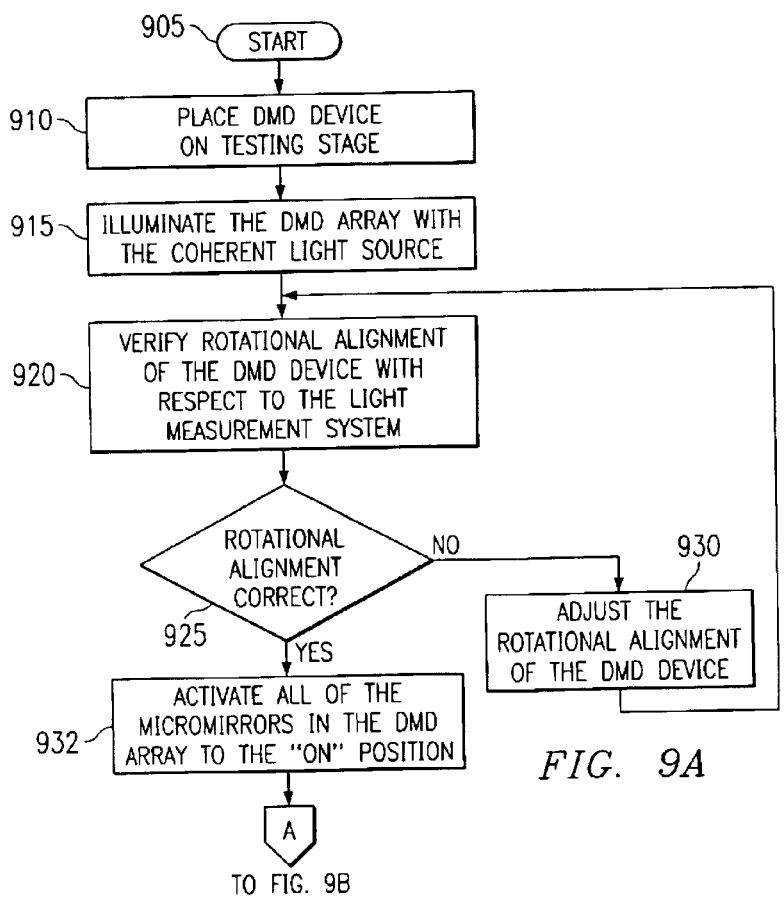
FIGS. 9A and 9B depict a flowchart for computer program suitable for use with disclosed apparatus and method.
Figure 9B:
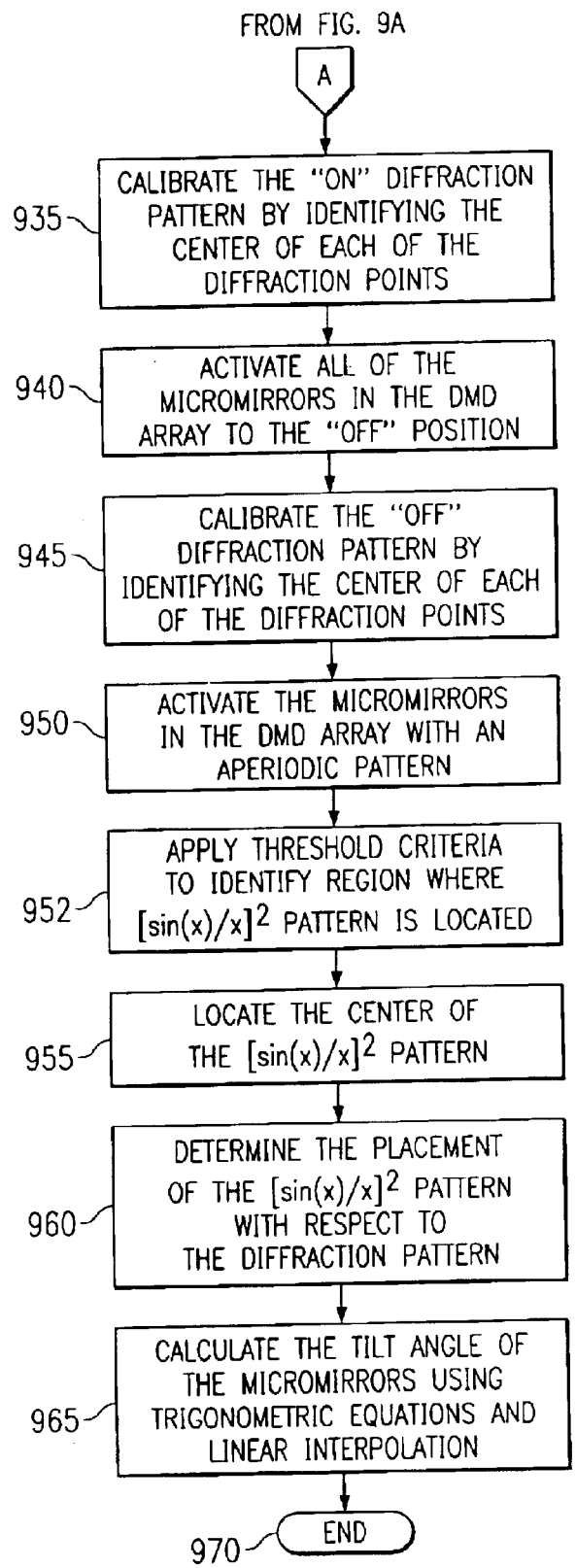

A flow chart depicting the steps performed by the computer systems 615 when it is measuring the tilt angle of micromirrors on a DMD array are found in FIGS. 9A & 9B. According to FIG. 9A, the process starts (905) when a DMD device is placed on a testing stage (910). Next, the DMD device is illuminated with a light source so as to display a diffraction pattern onto the ground glass 120 or a screen (915). Next, the rotational alignment of the DMD device with respect to the light measurement system 600 may be verified (920). If the rotational position of the DMD device is not aligned with the light measurement system (925), then the rotational position of the DMD device is adjusted (930). This adjustment may be performed in at least two different ways. First, the stage on which the DMD device is mounted may be physically rotated with respect to the light measurement system 600 so that the displayed diffraction pattern is properly aligned. Second, software built into the computer system 615 can perform a rotational adjustment of the image captured by the camera 610 so that physical rotation of the testing stage is not necessary. Once the rotational alignment of the DMD device is correct (925), the diffraction pattern displayed on the screen must be calibrated. This can be accomplished by performing the following.

First, all of the micromirrors in the DMD device are activated to the on position (932) so that an "on" diffraction pattern is displayed on the ground glass or screen. Next, the "on" diffraction pattern is calibrated by identifying the precise location of each of the diffraction points on the screen (935). This can be performed in a variety of ways such as processing each of the diffraction points with a center-of-mass algorithm. After each of the "on" diffraction points have been calibrated, the "off" diffraction points must be calibrated. Much like the previously described steps, this process starts by activating all of the micromirrors in the DMD device to the "off" position (940). Each of these "off" diffraction points may then be calibrated by finding the precise location of these points on the screen (945). Again, this may be performed using a variety of algorithms, such as the previously described center-of-mass algorithm. After the diffraction patterns have been calibrated, the computer system 615 is ready to measure the tilt angle of the micromirrors on the DMD device.

The first step in measuring the tilt angle of the micromirrors on the DMD device is to activate the micromirrors with an aperiodic pattern having a relatively flat power spectrum density distribution (950). As described previously in this application, when the DMD device is illuminated with a coherent light source, the DMD device will cause a diffraction pattern and a $[\sin(x)/x]^2$ pattern and a diffraction pattern to be displayed on the screen. The screen image is captured by a video camera and the image data is further processed by the computer system 615. Within the computer system 615, a threshold criteria can be applied to the image data to determine the region on the screen where the $[\sin(x)/x]^2$ pattern is located (952). Although using a threshold criteria process will identify the center of the $[\sin(x)/x]^2$ pattern more efficiently, this step can be omitted by the computer system 615. After the relevant region is identified, the center of the $[\sin(x)/x]^2$ pattern is determined (955) by using the computer system 615. The center of the $[\sin(x)/x]^2$ pattern can be determined using a center-of-mass algorithm or any other suitable technique. After this, the position of the $[\sin(x)/x]^2$ pattern with respect to the calibrated diffraction pattern is measured (960). After this measurement has been made, the tilt angle of the micromirrors can be calculated by using trigonometric equations and linear interpolation (965). At this point, the process of measuring the tilt angle is complete (970). It should be noted that the flow charts depicted in FIGS. 9A and 9B describe only one representative process utilized by the computer system 615 for calculating the tilt angle of the micromirrors and that other equivalent processes will be apparent to one of ordinary skill in the art.

The Mathematical Model of the Diffraction Pattern

Figure 8A:
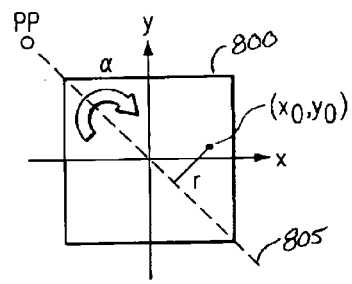
FIG. 8A is schematic diagram of a micromirror according to one aspect of the invention.
Figure 8B:
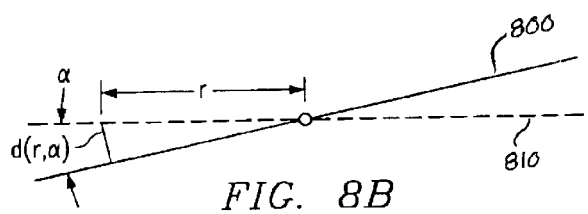
FIG. 8B is cross sectional view of the micromirror depicted in FIG. 9A according to another aspect of the invention.

The mathematical derivations underlying the principles of this invention are described in further detail below. The first set of derivations are based upon a single square mirror that has a hinge that runs diagonally through the mirror. A representative embodiment of this mirror is depicted in FIG. 8A. In FIG. 8A, a mirror 800 is depicted with a hinge 805 that passes diagonally through the mirror 800. Also depicted in FIG. 8A is a set of x and y axes aligned with the mirror 800 to identify the location of a particular spot on the mirror 800. A cross-sectional view of mirror 800 from point PP is depicted in FIG. 8B. In FIG. 8B, the mirror 800 is deflected at an angle $\alpha$ from its resting position 810. The radial position R of a point on the mirror $(X_o, Y_o)$ is defined by the following formula:

$$R = X_o \cos 45° + Y_o \sin 45° = \frac{x_o + y_o}{\sqrt{2}}$$

Accordingly, the depth function $D(r, \alpha)$ of a specific point on the mirror $(X_o, Y_o)$, wherein the depth of the point is measured from the resting position of the mirror 800, is defined by the following formula:

$$D(R, \alpha) = \frac{(Xo + Yo)\sin\alpha}{\sqrt{2}}$$

Now for the paraxial case ($\alpha$ small) we consider plane wave illumination along the Z axis (i.e. perpendicular to the resting plane of the mirror 800). The "round trip" phase delay associated with a plane wave traveling an extra distance $2D(R,\alpha)$ is given by $\alpha\theta=2k*D(R,\alpha)$. In addition, the mirror geometry imposes a simple aperture function, which for the case of $\alpha=0$ is defined by the following formula:

$$\Lambda(x,y) = \text{rect}(x/k_dT)\text{rect}(y/k_dT)$$

wherein T is the pitch (spatial period of the mirrors), $k_d$ is the "fill factor" of the mirror, and the "rect" function is defined by:

$$\text{rect}(x) = \begin{cases} 1, & |x| < 0.5 \\ 0, & |x| > 0.5 \end{cases}.$$

For nonzero $\alpha$, the apparent aperture distorts slightly (into more of a "diamond" shape), but for tilt angles of $\pm 12°$, this distortion is relatively insignificant and will be disregarded, as will the obliquity factor.

As a result, the reflected field for a single mirror 800 can be described by the following equation:

$$\hat{E}(x, y) = \Lambda(x, y)\exp(-j\Delta\theta) = \hat{E}_x(x)\hat{E}_y(y) =$$
$$\left\{\text{rect}\left[\frac{x}{k_dT}\right]\exp(-j\sqrt{2}\, kx\, \sin\alpha)\right\}\left\{\text{rect}\left[\frac{y}{k_dT}\right]\exp(-j\sqrt{2}\, ky\, \sin\alpha)\right\}.$$

Because this equation is separable, an array of mirrors can be emulated by convolving this equation with a periodic "comb" function, such as the one written below:

$$E(x,y) = E_x(x)E_y(y) \text{ where:}$$

$$E_x(x) = \frac{1}{T}\text{comb}(x/T) * \left\{\text{rect}\left[\frac{x}{k_dT}\right]\exp(-j\sqrt{2}\, kx\, \sin\alpha)\right\} E_y(y) =$$
$$\frac{1}{T}\text{comb}(y/T) * \left\{\text{rect}\left[\frac{y}{k_dT}\right]\exp(-j\sqrt{2}\, ky\, \sin\alpha)\right\},$$

$$\text{and where } \text{comb}(x/T) = T\sum_{n=-\infty}^{+\infty}\delta(x - nT),$$

and $\delta(x)$ is the well-known Dirac delta function. Finally, a Gaussian equation, which describes the spatial profile of a typical gas laser beam, is utilized as follows:

$$E(r) = \exp[-(r/W)^2] = \exp[-(x/W)^2]\exp[-(y/W)^2].$$

It should be noted that this equation is separable, like the functions describing the reflected field of the mirrors. Applying the Gaussian equation to the equations describing the reflected field of the mirrors produces the following equations.

$$E(x,y) = E_x(x)E_y(y) \text{ where:}$$

$$E_x(x) = \exp[-(x/W)^2]\left\{\frac{1}{T}\text{comb}(x/T) * \left[\text{rect}\left[\frac{x}{k_dT}\right]\exp(-j\sqrt{2}\, kx\, \sin\alpha)\right]\right\}$$

-continued $$E_y(y) = \exp[-(y/W)^2]\left\{\frac{1}{T}\text{comb}(y/T) * \left[\text{rect}\left[\frac{y}{k_dT}\right]\exp(-j\sqrt{2}\ ky\ \sin\alpha)\right]\right\}.$$

In this equation, W is the "waist" of the illumination beam that is determined by how tightly the laser beam is focused before striking the mirror array.

The Gaussian illumination profile serves to effectively window the otherwise infinite array of mirrors. For purposes of characterizing the micromirror array, the angular plane wave spectrum generated by that array is of particular interest. This spectrum can be obtained by a simple Fourier transform, then replacing the transform variables ($f_x$, $f_y$) with (sin $\Phi/\lambda$, sin $\Phi'/\lambda$) respectively. This is made easier by the fact that E(x,y) is separable. The following Fourier Transform relations are also useful:

$$F\{\exp[-(x/W)^2]\} \to \sqrt{\pi}W\exp[-(\pi Wf_x)^2];$$

$$F\left\{\frac{1}{T}\text{comb}(x/T)\right\} \to \text{comb}(Tf_x);$$

$$F\left\{\text{rect}\left[\frac{x}{k_dT}\right]\right\} \to k_dT\ \text{sinc}(k_dTf_x);\ \text{and}$$

If $g(x) \to G(f_x)$, then $g(x)\exp(-j2\pi ax) \to G(f_x+a)$.

This gives:

$$F\left\{\text{rect}\left[\frac{x}{k_dT}\right]\exp(-j\sqrt{2}\ kx\sin\alpha)\right\} \to k_dT\text{sinc}[k_dT(f_x + \sqrt{2}\sin\alpha/\lambda)].$$

Applying these facts and using the convolution theorem gives the following equation:

$$F\{E(x)\} = \sqrt{\pi}\ Wk_dT\exp[-(\pi Wf_x)^2] * \left\{\text{comb}(Tf_x)\text{sinc}\left[k_dT\left(f_x + \frac{\sqrt{2}\sin\alpha}{\lambda}\right)\right]\right\}$$

Because the micromirror array is symmetrical about the X and Y axes, F $\{E(f_y)\}$ is identical to this equation, with the exception that $f_x$ is replaced with $f_y$. Accordingly, the diffraction pattern may be described by the rightmost term which is periodic, convolved with the Gaussian "point spread function." By replacing $f_x$ with sin $\phi/\lambda$ etc., the following equation is rendered:

$$\tilde{A}(\phi, \phi') = \pi(Wk_dT)^2 X\exp[-(\pi W\sin\phi/\lambda)^2] *$$

$$\left\{\text{comb}(T\sin\phi/\lambda)\text{sinc}\left[\frac{k_dT}{\lambda}(\sin\phi + \sqrt{2}\sin\alpha)\right]\right\}$$

$$X\exp[-(\pi W\sin\phi'/\lambda)^2] *$$

$$\left\{\text{comb}(T\sin\phi'/\lambda)\text{sinc}\left[\frac{k_dT}{\lambda}(\sin\phi' + \sqrt{2}\sin\alpha)\right]\right\}$$

This equation can also be expressed as a periodic array of diffracted Gaussian spots, weighted by a sinc envelope where sinc(x)=sin($\pi$x)/$\pi$x, as:

+e,otl A+ee $(\phi,\phi')=\pi(Wk_dT)^2\tilde{A}_\phi(\phi)\tilde{A}_{\phi'}(\phi')$ where:

$$\tilde{A}_\phi(\phi) = \text{sinc}\left[\frac{k_dT}{\lambda}(\phi + \sqrt{2}\sin\alpha)\right]\sum_{m=-\infty}^{\infty}\exp\left[-\left(\frac{\pi W}{\lambda}\right)^2\left(\phi - \frac{m\lambda}{T}\right)^2\right]$$

$$\tilde{A}_{\phi'}(\phi') = \text{sinc}\left[\frac{k_dT}{\lambda}(\phi' + \sqrt{2}\sin\alpha)\right]\sum_{n=-\infty}^{\infty}\exp\left[-\left(\frac{\pi W}{\lambda}\right)^2\left(\phi' - \frac{m\lambda}{T}\right)^2\right].$$

In these equations, the liberty of making the paraxial approximations sin $\phi \cong \phi$, sin $\phi' \cong \phi'$ has been taken. In this particular embodiment, the [sin(x)/x]2 (actually described above in terms of a sinc function, although we understand that sinc(x)=(sin($\pi$x)/$\pi$x) distribution moves in a diagonal direction as the tilt angle (a) varies (i.e. it has equal components of displacement in the $\phi$ and $\phi'$ directions), whereas in FIG. 5, the [sin(x)/x]$^2$ distribution moves in the horizontal direction. This can be reconciled by simply applying a (45°) rotation of coordinate operation to the above equation using:

$$\begin{bmatrix}\phi_n \\ \phi'_n\end{bmatrix} = \begin{bmatrix}\cos 45° & \sin 45° \\ -\sin 45° & \cos 45°\end{bmatrix}\begin{bmatrix}\phi \\ \phi'\end{bmatrix},$$

where $\phi_n$ now represents the horizontal axis and $\phi_n'$ the vertical axis. We refrain from carrying on this calculation here, in the interest of brevity.

Several additional observations should be made at this point. First, the sinc term creates a wide "envelope," which is centered at angle $\phi=\sqrt{2}\sin\alpha$. The period between nulls of the sinc pattern=$\lambda/(k_dT)$. Second, the comb function determines the periodicity of the diffraction pattern. The angular period is $\lambda/T$, which is nearly the same as the sinc period, particularly when $k_d$ approaches unity. This could result in "beat frequency" effects, whereby various diffraction spots will occasionally fall on the null of the sinc$^2$ distribution in a predictable manner. Third, the width of individual spots is, of course, inversely proportional to the number of mirrors illuminated—which depends on W, the waist of the incoming laser beam. Therefore, the diffracted spot size is apparently given by $S_d=2\lambda/\pi W$.

Use of Aperiodic Patterns to Reveal Underlying "Sinc" Distributions

First, we reiterate the following embodiment of the diffraction pattern:

$$\tilde{A}(\phi,\phi')=\pi(Wk_dT)^2\tilde{A}_\phi(\phi)\tilde{A}_{\phi'}(\phi')\ \text{where:}$$

$$\tilde{A}_\phi(\phi) = \sum_{m=-\infty}^{\infty}\text{sinc}\left[\frac{k_dT}{\lambda}(\phi + \sqrt{2}\sin\alpha)\right]\exp\left[-\left(\frac{\pi W}{\lambda}\right)^2\left(\phi - \frac{m\lambda}{T}\right)^2\right];\ \text{and}$$

$$\tilde{A}_{\phi'}(\phi') = \sum_{n=-\infty}^{\infty}\text{sinc}\left[\frac{k_dT}{\lambda}(\phi' + \sqrt{2}\sin\alpha)\right]\exp\left[-\left(\frac{\pi W}{\lambda}\right)^2\left(\phi' - \frac{m\lambda}{T}\right)^2\right].$$

Next, it is noted that the spatial light angular intensity distribution follows a pattern $|\tilde{A}(\phi,\phi')|^2$. Accordingly, by squaring out the terms, and making use of the fact that cross-terms are negligible (assuming the spot size of the diffraction orders is much less than the angular spacing of the orders, (i.e. W<<$\sqrt{2}\lambda/T$), the (normalized) angular intensity distribution may be expressed as:

$$|\tilde{A}(\phi, \phi')|^2 =$$

$$\sum_{m=-\infty}^{+\infty}\sum_{n=-\infty}^{+\infty}\exp\left\{-2\left(\frac{\pi W}{\lambda}\right)^2[(\phi = m\lambda/T)^2 + (\phi' - n\lambda/T)^2]\right\}\times$$

-continued $$\text{sinc}^2\left[\frac{k_d T}{\lambda}(\phi + \sqrt{2}\sin\alpha)\right]\text{sinc}\left[\frac{k_d T}{\lambda}(\phi' + \sqrt{2}\sin\alpha)\right]$$

The first term of this equation reflects a periodic array of small/discrete Gaussian spots, and it is this discreteness that veils the second $[(\sin x)/x]^2$ (or $\text{sinc}^2$) terms that we hope to see, since they contain the "$\alpha$" term (i.e. the mirror tilt angle) that we are attempting to ascertain. This discreteness comes from the fact that we are observing the far-field intensity pattern, which in accordance with "Fourier Optics" or the wave theory of light, is related to the original spatial distribution of the light by means of a Fourier transform and because the original distribution of the micromirrors is periodic since all mirrors have been written to the same state (e.g. all on, or all off). It is well known that the Fourier transform of any periodic function results in an array of discrete points. It is this discreteness that frustrates our ability to discern where the centroid of the sinc term lies. Hence a simple solution is to eliminate the periodicity of the mirrors. This can be accomplished by writing an aperiodic pattern to the mirrors, rather than writing them to all on or all off states. Without going into further mathematical detail, it can be shown that the best candidate patterns are patterns that have a relatively uniform power spectral density distributions. For example, assigning mirrors randomly to On or Off states is akin to "white noise," which is know to have uniform power spectral density. Another candidate is a suitably chosen sinusoidal "chirp" pattern, i.e. a sinusoidal spatial distribution where the spatial frequency of the sinusoid pattern changes monotonically with position. It should be noted that in order to render a sinusoidal pattern onto the DMD array (where mirrors can only be assigned states of ON or OFF) a dithering technique is used. This technique is somewhat akin to halftoning techniques used in the printing industry. These "chirp" distributions have been shown to also work in revealing the $[(\sin x)/x)]^2$ distributions. A disadvantage of using a chirp pattern, however, is that it has a "centroid" associated with it. Thus, the optical axis illuminating laser, which typically has a Gaussian profile, has to be aligned with the centroid of the spatial pattern. The random (or "noise") pattern, however, is homogeneous in nature, thus there is no such alignment sensitivity.

Although certain embodiments and aspects of the present inventions have been illustrated in the accompanying drawings and described in the foregoing detailed description, it will be understood that the inventions are not limited to the embodiments disclosed, but are capable of numerous rearrangements, modifications and substitutions without departing from the spirit of the invention as set forth and defined by the following claims and equivalents thereof.

We claim:

1. A method for measuring a tilt angle of a micromirror array, the method comprising:
    activating a pattern of micromirrors on the micromirror array, the pattern corresponding to a function having uniform power spectral density;
    applying a coherent light beam to the micromirror array wherein the coherent light beam passes through an aperture in a screen before reaching the surface of the micromirror array;
    wherein the activated pattern of micromirrors generates a reflected pattern on the screen, the reflected pattern comprising:
    a first spot corresponding to a beam of light that has been reflected from the surface of the micromirror array at an angle equal to the angle of incidence of the coherent light beam;
    a series of second spots arranged along a line passing through the first spot wherein each of the second spots corresponds to a respective diffraction order; and
    a pair of reflected shapes arranged along the line;
    measuring a distance from a first spot to the center of one of the reflected shapes;
    determining a diffraction order number corresponding to the measured distance from the first spot to one of the reflected shapes; and
    calculating the tilt angle of the micromirror array by applying the diffraction order number to a trigonometric equation.

2. A method according to claim 1, wherein the function having uniform power spectral density corresponds to an aperiodic white noise pattern.

3. A method according to claim 1, wherein the trigonometric equation corresponds to ½ ARCSIN [N*√2*λ)/T] wherein N corresponds to the measured diffraction order number, λ corresponds to a wavelength of the coherent light beam, and T corresponds to a pitch of the micromirrors in the micromirror array.

4. A method according to claim 1, wherein the function having uniform power spectral density corresponds to a frequency chirped sinusoidal pattern.

5. A method according to claim 4, wherein the coherent light beam is aligned with a central location of the frequency chirped sinusoidal pattern on the micromirror array.

6. A method according to claim 1, further comprising:
    determining a location of a first reflected shape along the line, wherein the first reflected shape corresponds to the activated mirrors in the micromirror array;
    determining a location of a second reflected shape along the line, wherein the second reflected shape corresponds to the deactivated mirrors in the micromirror array;
    measuring a first distance from a first spot to the location of the first reflected shape;
    determining a first diffraction order number corresponding to the first measured distance;
    calculating the tilt angle of the activated mirrors in the micromirror array by applying the first diffraction order number to a trigonometric equation;
    measuring a second distance from a first spot to the location of the second reflected shape;
    determining a second diffraction order number corresponding to the second measured distance; and
    calculating the tilt angle of the deactivated mirrors in the micromirror array by applying the second diffraction order number to a trigonometric equation.

7. A method according to claim 6, wherein the trigonometric equation corresponds to ½ ARCSIN [(N*√2*λ)/T ], wherein N corresponds to a measured diffraction order number, λ corresponds to a wavelength of the coherent light beam, and T corresponds to a pitch of the micromirrors in the micromirror array.

8. An apparatus for measuring a tilt angle of an array of micromirrors, the apparatus comprising:
    a stage for mounting a micromirror array;
    a computer memory encoded with a pattern having a uniform power spectral density;
    an electronic coupling device adapted to electrically connect the computer memory to a micromirror array loaded on the stage and thereby provide the pattern having a uniform power spectral density to the micromirror array;

a coherent light source adapted to provide a beam of coherent light that is directed towards the micromirror array stage;

a screen comprising an aperture through which the beam of coherent light passes; and a camera adapted to monitor a diffraction pattern generated by a micromirror array that is loaded onto the stage when it is illuminated with the beam of coherent light.

9. An apparatus according to claim 8, wherein the pattern having uniform power spectral density corresponds to an aperiodic, white noise pattern.

10. An apparatus according to claim 8, wherein the pattern having uniform power spectral density corresponds to a frequency chirped sinusoidal pattern.

11. An apparatus according to claim 10, wherein the coherent light beam is aligned with a central location of the frequency chirped sinusoidal pattern on a micromirror array that is mounted on the stage.

12. An apparatus according to claim 8, further comprising:

a computer system connected to the camera, wherein the computer system comprises a computer memory encoded with instructions for performing a) through d):

a) processing the image provided by the camera to identify a reflected pattern comprising:
   a first spot corresponding to a beam of light that has been reflected from the surface of the micromirror array at an angle equal to the angle of incidence of the coherent light beam;
   a series of second spots arranged along a line passing through the first spot wherein each of the second spots corresponds to a respective diffraction order; and
   a pair of reflected shapes arranged along the line;

b) measuring a distance from a first spot to the center of one of the reflected shapes;

c) determining a diffraction order number corresponding to the measured distance from the first spot to one of the reflected shapes; and d) calculating the tilt angle of the micromirror array by applying the diffraction order number to a trigonometric equation.

13. An apparatus according to claim 12, wherein the computer memory is further encoded with instructions for performing the following:

determining a location of a first reflected shape along the line, wherein the first reflected shape corresponds to the activated mirrors in the micromirror array;

determining a location of a second reflected shape along the line, wherein the second reflected shape corresponds to the deactivated mirrors in the micromirror array;

measuring a first distance from a first spot to the location of the first reflected shape;

determining a first diffraction order number corresponding to the first measured distance;

calculating the tilt angle of the activated mirrors in the micromirror array by applying the first diffraction order number to a trigonometric equation;

measuring a second distance from a first spot to the location of the second reflected shape;

determining a second diffraction order number corresponding to the second measured distance; and calculating the tilt angle of the deactivated mirrors in the micromirror array by applying the second diffraction order number to a trigonometric equation.

14. An apparatus according to claim 13, wherein the trigonometric equation corresponds to ½ ARCSIN $[(N*\sqrt{2}*\lambda)/T]$, wherein N corresponds to a measured diffraction order number, $\lambda$ corresponds to a wavelength of the coherent light beam, and T corresponds to a pitch of the micromirrors in the micromirror array.

* * * * *